Nov. 21, 1967 S. P. VIDAL 3,353,610
LIQUID FILM MAINTAINING APPARATUS
Filed Aug. 1, 1966 2 Sheets-Sheet 1

Steven P. Vidal
INVENTOR.

BY *Clarence A. O'Brien*
and *Harvey B. Jackson*
Attorneys

Nov. 21, 1967  S. P. VIDAL  3,353,610
LIQUID FILM MAINTAINING APPARATUS
Filed Aug. 1, 1966  2 Sheets-Sheet 2
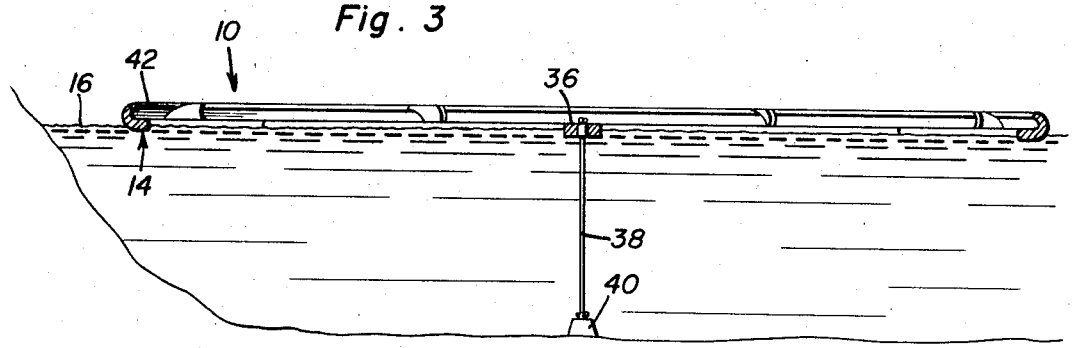
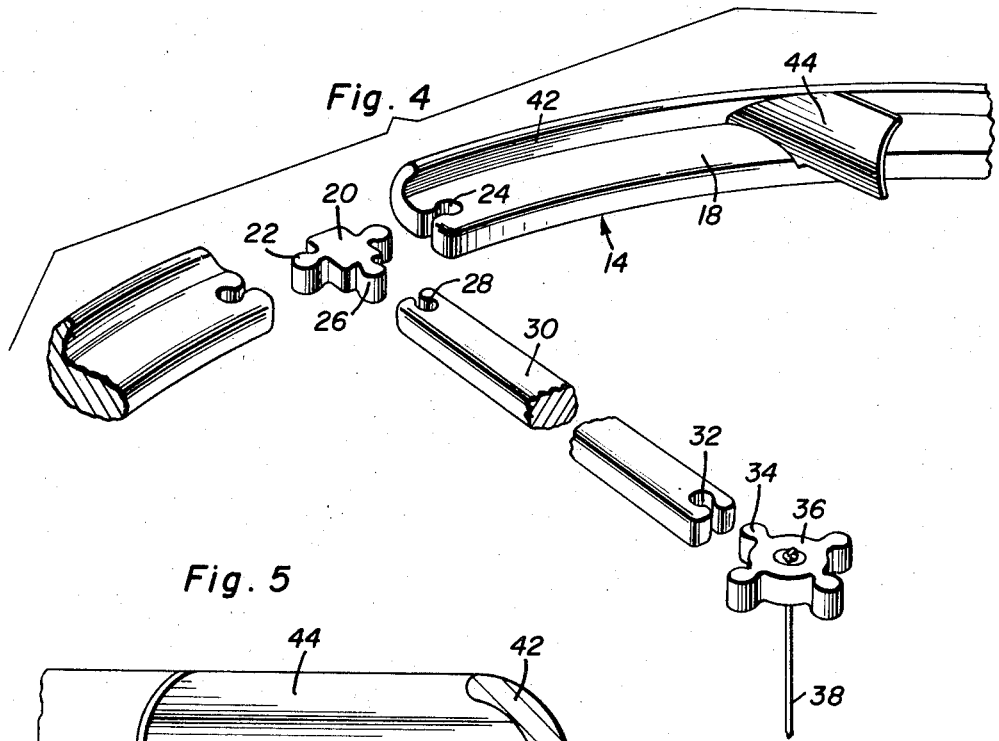
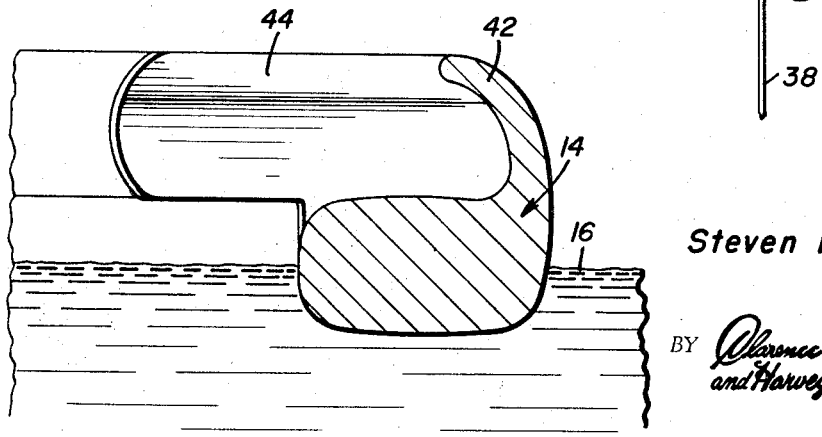
Steven P. Vidal
INVENTOR.

United States Patent Office 3,353,610
Patented Nov. 21, 1967

3,353,610
LIQUID FILM MAINTAINING APPARATUS
Steven P. Vidal, 1213 Gold SW.,
Albuquerque, N. Mex. 87102
Filed Aug. 1, 1966, Ser. No. 569,336
10 Claims. (Cl. 170—8)

This invention relates to the use of liquid films on the surface of bodies of water for the purpose of controlling excessive surface evapoartion.

The use of monomolecular liquid films on the surface of bodies of water such as artificial lakes or reservoirs, is well known. A problem arises, however, in connection with such liquid films because of winds displacing the film and exposing portions of the water surface to evaporation. It is therefore a primary object of the present invention to provide facilities whereby the liquid or any other protective coating material when displaced by the wind is redistributed so as to prevent any substantial exposure of the water body surface.

In accordance with the foregoing object, the present invention features a plurality of annular float members arranged in groups and enclosing surface portions of the body of water confining therewithin a portion of the liquid film. In response to winds from any direction, rotation is imparted to the respective annular float members which operate as barriers limiting displacement of the liquid film.

Another important object of the present invention in accordance with the foregoing is to provide annular float members on the surface of a body of water coated with a liquid film for control of evaporation, the float members being provided with vanes causing rotation thereof in response to a wind in any direction so that the liquid film confined within the float members may be redistributed by rotation of the float members preventing the liquid film from being concentrated at any location within the float member.

An additional object of the present invention is to provide a circular float member which is anchored at a desired location over the surface of a body of water to form an annular barrier within which a liquid film is confined. When so anchored, a rotational axis for the float member is established about which it may be rotated under the influence of winds to thereby prevent the wind from concentrating the liquid film at one location.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged sectional view taken substantially through a plane indicated by the section line 3—3 in FIGURE 1;

FIGURE 4 is a perspective view of various disassembled parts of one of the float members; and FIGURE 5 is an enlarged partial sectional view taken substantially through a plane indicated by the section line 5—5 in FIGURE 2.

Figure 1:
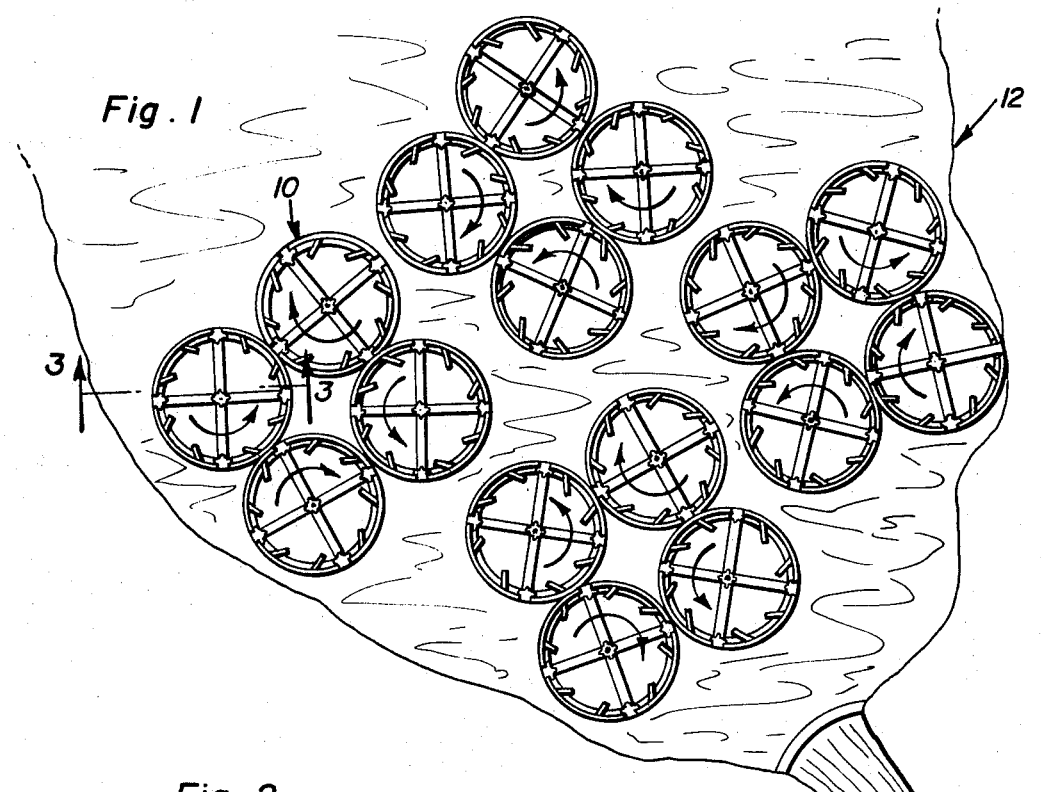
FIGURE 1 is a top plan view of a typical installation for the apparatus of the present invention.
Figure 2:
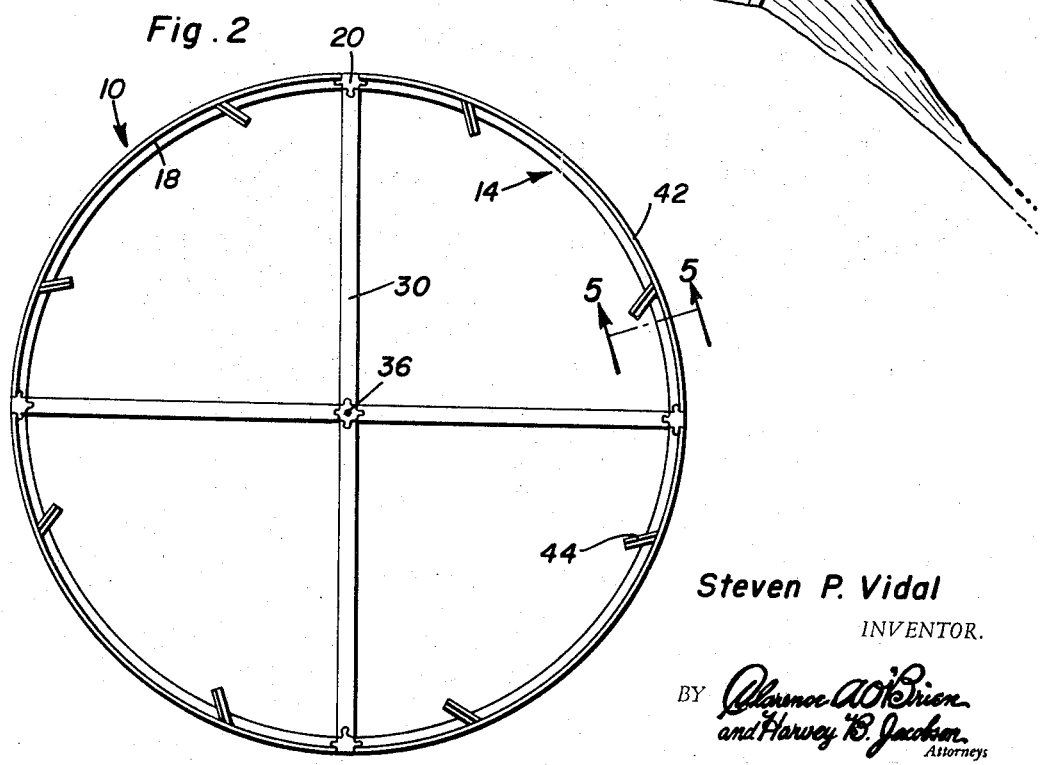
FIGURE 2 is an enlarged top plan view of one of the float members shown in FIGURE 1.

Referring now to the drawings in detail, it will be observed from FIGURE 1 that a plurality of float members 10 preferably arranged in groups are disposed on the surface of a body of water 12 which may be an artificial lake or reservoir. In order to control evaporation of water, the surface of the body of water 12 is provided with a monomolecular liquid film. The film, however, is subject to displacement by winds. The groups of float members therefore enclose a substantial surface area over the body of water in order to limit such displacement of the liquid film by winds as well as to redistribute the liquid film being displaced by the wind within the surface area enclosed by the float members. This is accomplished by rotation of the float members. The float members as shown in FIGURE 1 are arranged in groups of four in frictional contact with each other so that all of the float members within each group are simultaneously rotated. It will therefore be apparent that the float members must be held substantially stationary at one location for rotation about relatively fixed rotational axes. The number of float members, groups and the sizes thereof may of course be varied in order to meet different requirements.

Referring now to FIGURES 2 through 5, it will be observed that each float member 10 includes a circular body member 14 made of a suitable, buoyant material so that the float member may float on the surface 16 of the water. In one embodiment of the invention, the circular body member 14 is assembled from arcuate sections 18 which are interconnected by interlocking elements 20 having oppositely extending projections 22 received within end slots 24 in each section 18. Thus, each float member which is of a substantial size, may be conveniently disassembled in order to form a small package for transport purposes. It will, of course, be appreciated that other structural arrangements could be utilized for disassembly purposes and that the circular body member could be made of one piece.

The connector elements 20, are also provided with an inwardly extending projection 26 adapted to be received in the slot 28 at the radial outer end of a spoke member 30. A plurality of radial spoke members 30 are therefore associated with each float member, the spoke members being also provided with slots 32 at the radial inner ends thereof adapted to receive the projections 34 on a central connector hub 36. The spoke members 30 and the hub 36 are also made of a suitable buoyant material, the hub being connected to the upper end of an anchor line 38. An anchor weight 40 is therefore connected to the lower end of the anchor line 38 in order to hold the float member 10 substantially stationary at its location as well as to establish a rotational axis about which the circular body mmeber 14 is rotatable while floating on the surface of the body of water.

The circular body member is provided with a cross-sectionally curved rim portion 42 which extends upwardly and radially inwardly of the float member so as to define therewithin the liquid film floating on the surface of the water. Also connected to the circular body member 14, in circumferentially spaced relation to each other, are a plurality of vane or blade members 44. The blade members extend inwardly at an acute angle from the circular body member 14 above the surface of the water and are cross-sectionally curved. The curvature and angular disposition of the blade members 44 associated with one float member extend in the same rotational direction so that winds in only certain directions will impinge upon the blade members causing rotation of the float member in one rotational direction. Thus, by arranging the float members in groups, rotation will be imparted to at least one of the float members in each group regardless of the direction of the wind.

It will be apparent therefore from the foregoing description that in response to any wind blowing over the surface of the body of water 12, the float members 10 within each group will be rotated in a direction dependent upon the direction of the wind. The rim portions 42 of adjacent float members in each group frictionally engage each other so as to ensure simultaneous rotation of all the float members. The angular direction of the blade members 44 within each of the float members of each group are therefore arranged accordingly. In view of the rotation imparted to the float members, any water surface coating material in contact therewith will be circulated to thereby prevent any tendency for the coating material or liquid film to accumulate at one circumferential portion of the float member which otherwise acts as a barrier limiting displacement of the liquid film to the surface area enclosed. Thus, the rotating float members prevent any wind from leaving substantial portions of the water surface exposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for preserving the distribution of a liquid film over the surface of a body of water comprising, barrier means enclosing a surface area on said body of water for limiting displacement of said liquid film by wind, and vane means mounted by said barrier means for movement thereof under the influence of said wind to redistribute the liquid film displaced within said surface area enclosed by the barrier means.

2. The combination of claim 1 wherein said barrier means comprises a plurality of annular flat members, said vane means being mounted on each of said float members for movement thereof about spaced rotational axes.

3. The combination of claim 2 wherein said annular float members are arranged in groups, the float members in each group being in operative engagement with each other for simultaneous movement.

4. The combination of claim 3 including anchoring means connected to each of said float members for substantially fixing the rotational axis about which each of the float members rotates.

5. The combination of claim 4 wherein each float member includes a buoyant annular body and a rim portion connected to said body projecting upwardly and radially inwardly therefrom to confine a portion of the liquid film within the annular body.

6. The combination of claim 5 wherein said vane means includes a plurality of curved blade members secured to each of the float members in circumferentially spaced relation to each other, the blade members on each of the respective float members extending inwardly therefrom at an acute angle in the same rotational direction.

7. Apparatus for redistributing a coating displaced by wind over the surface of a body of water comprising, at least one annular float member enclosing a surface area on said body of water, and wind operated means mounted on said float member for rotation thereof about a rotational axis.

8. The combination of claim 7 including anchoring means connected to the float member for holding said rotational axis substantially stationary.

9. The combination of claim 8 wherein said wind operated means comprises a plurality of curved blade members secured to the float member, said blade members extending inwardly at an acute angle in the same rotational direction.

10. The combination of claim 9 wherein said float member includes a buoyant annular body, a rim portion connected to said body projecting upwardly and radially inwardly therefrom, a hub connected to said anchoring means and spokes connecting the annular body to the hub.

No references cited.

EVERETTE A. POWELL, JR., *Primary Examiner.*